(12) United States Patent
Johnson

(10) Patent No.: US 6,234,452 B1
(45) Date of Patent: *May 22, 2001

(54) HAND OPERABLE MOTORCYCLE STAND

(76) Inventor: Robert C. Johnson, 7741 - 237th Ave. NE., Stacy, MN (US) 55079

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/018,029

(22) Filed: Feb. 3, 1998

Related U.S. Application Data

(60) Provisional application No. 60/060,566, filed on Sep. 30, 1997.

(51) Int. Cl.[7] .................................................. B66F 7/22
(52) U.S. Cl. ............................................................ 254/131
(58) Field of Search ................................. 254/10 R, 10 B, 254/10 C, 131, 120, 134, 133, 90, 91, DIG. 1

(56) References Cited

U.S. PATENT DOCUMENTS

| | | |
|---|---|---|
| 1,171,049 | 2/1916 | Jeffery . |
| 1,307,600 | 6/1919 | Rose et al. . |
| 1,354,529 | 10/1920 | Alexander . |
| 1,492,461 | 4/1924 | Howe . |
| 2,543,276 * | 2/1951 | Buechler ............................ 254/131 |
| 4,113,235 | 9/1978 | Hartman . |
| 4,180,253 | 12/1979 | Ivers et al. . |
| 4,193,582 | 3/1980 | Neilsen . |
| 4,324,384 | 4/1982 | Elser . |
| 4,348,010 | 9/1982 | Baxter . |
| 5,139,232 * | 8/1992 | Bailey ........................... 254/DIG. 1 |
| 5,518,224 * | 5/1996 | Anderson ........................... 254/131 |
| 5,639,067 * | 6/1997 | Johnson ............................ 254/131 |
| 5,769,396 * | 6/1998 | Tischendorf ..................... 254/10 C |

* cited by examiner

*Primary Examiner*—Robert C. Watson
(74) *Attorney, Agent, or Firm*—Michael S. Sherrill

(57) ABSTRACT

A compact, hand-operable stand for quickly and easily elevating one end of a motorcycle, including (i) a longitudinally elongated base assembly with a foot plate extending from one end, (ii) a mounting assembly pivotably attached to the base assembly, and (iii) a support assembly secured to the mounting assembly for pivoting in combination with the mounting assembly between a clearance position and a support position. The mounting assembly bears against the base assembly when pivoted into the support position and includes multiple sites where the support assembly can be attached to the mounting assembly so as to permit the distance between the support assembly and the base assembly to be changed.

16 Claims, 13 Drawing Sheets

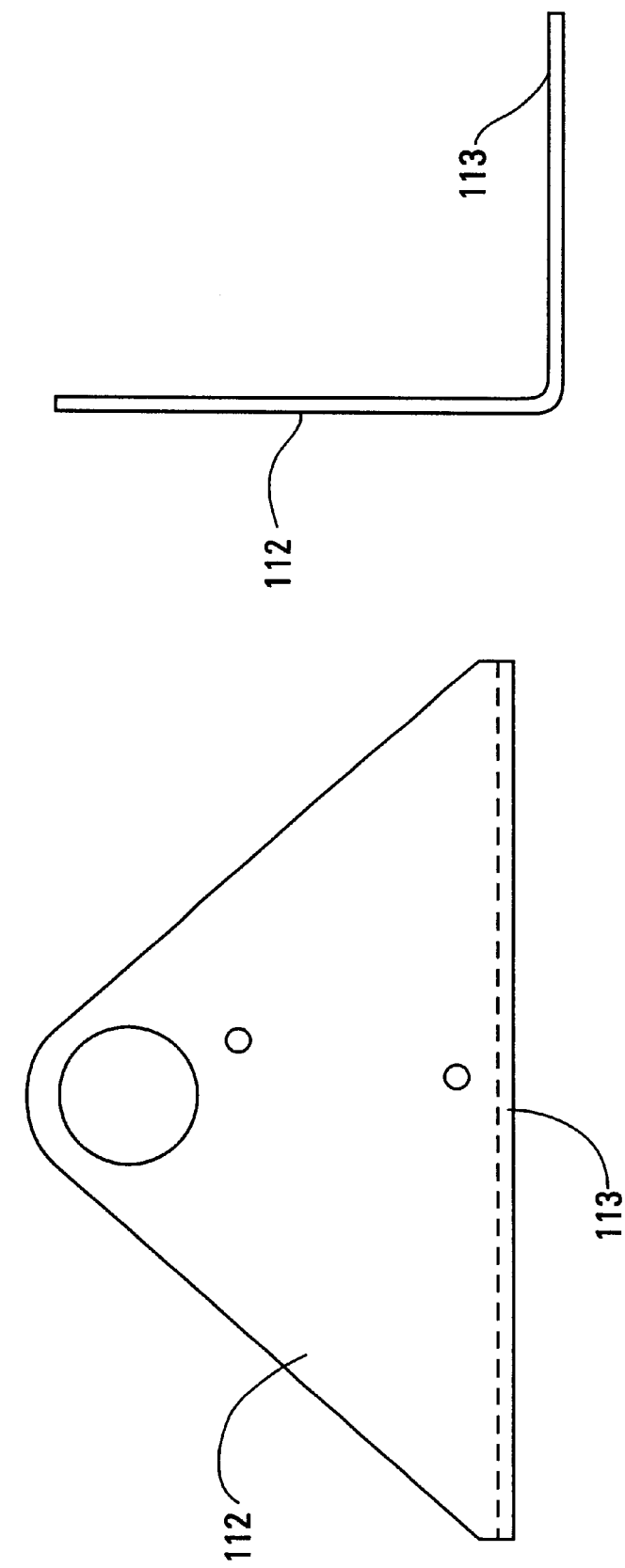

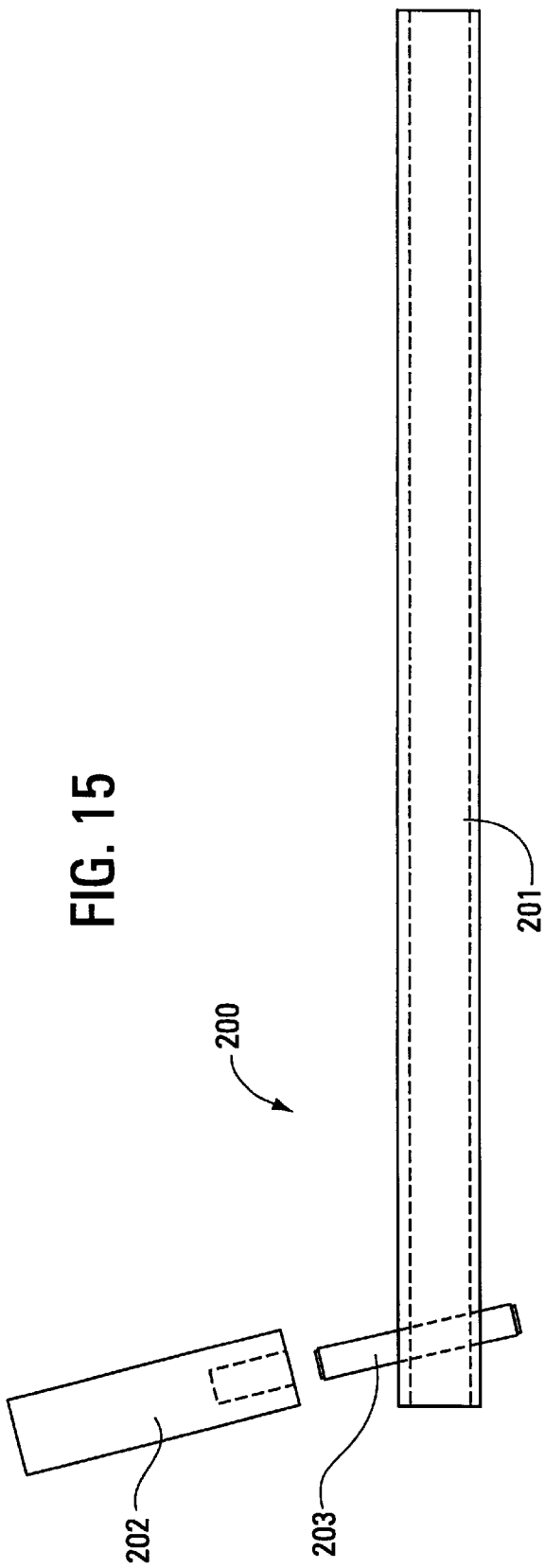

HAND OPERABLE MOTORCYCLE STAND

This application is a continuation-in-part of application Ser. No. 60/060,566, filed Sep. 30, 1997.

FIELD OF THE INVENTION

The present invention relates generally to jacks, and more particularly to portable jacks or supports for elevating at least one of the two ends of a motorized two-wheel vehicle such as a motorcycle.

BACKGROUND

The need has existed ever since motorized two-wheel vehicles were first developed for a convenient way to service the wheel and related components at one end of the vehicle. Although ramps or lifts may be helpful. they generally take up a large amount of space. Furthermore, the motorcycle may require emergency servicing at a location remote from the bulky ramps and lifts. as when a mechanical failure occurs while the motorcycle is on the road.

Attempts have also been made to rely on the motorcycle kickstand to support the cycle while servicing it. However, the kickstand, although attached directly to the frame of the cycle itself and therefore extremely portable, has a relatively pointed end that may dig into sand, grass or blacktop resulting in unstable support for the motorcycle. Additionally. using the kickstand will not lift the front or rear wheel of the cycle off the ground.

Devices are also known for elevating automobiles by engaging an axle of the vehicle. However, motorcycles lack a suitably exposed axle, and the adaptation of such devices to motorcycles have resulted in the risk of scratching or damaging the surface of the motorcycle frame with the lift.

A compact motorcycle stand is disclosed in U.S. Pat. No. 5,639,067 issued to Robert C. Johnson. The motorcycle stand includes a support roller (12) pivotably mounted to a base assembly (18) by means of an axle (56 and 58), with the axle fixedly attached to the support roller by a pair of brackets (14 and 16) and rotatably extending through a pair of bearings (50 and 52) secured to the base assembly. One end of the axle extends a distance beyond the base assembly for permitting rotation of the axle between a clearance position (forward of the base assembly) and a support position (above the base assembly) with a wrench (86) and appropriately sized socket (88).

While the motorcycle stand disclosed in U.S. Pat. No. 5,639,067 represents a significant advance, a continuing demand exists for still further improved motorcycle stands.

SUMMARY OF THE INVENTION

The invention is a compact, hand-operable stand for quickly and easily elevating one end of a motorcycle. The basic stand includes (i) a longitudinally elongated base assembly, (ii) a mounting assembly pivotably attached to the base assembly, and (iii) a support assembly secured to the mounting assembly for pivoting in combination with the mounting assembly. The mounting assembly and support assembly can be pivoted between a clearance position (i.e., mounting assembly and support assembly pivoted downward for permitting the stand to be slid underneath the frame of a motorcycle), and a support position (i.e., mounting assembly and support assembly pivoted upward for permitting the support assembly to contact the frame of a motorcycle and elevate at least one end of the motorcycle above grade).

The basic stand includes one or more additional features selected from (iv) configuring and arranging the base assembly and mounting assembly so that the mounting assembly bears against the base assembly when in the support position for preventing continued pivoting of the support assembly beyond the support position, (v) providing a means for repositionably attaching the support assembly to the mounting assembly at a plurality of different positions relative to the base assembly, with each position providing a different distance between the support assembly and the base assembly and thereby changing the height to which the stand is capable of elevating a motorcycle, (vi) providing a flange extending from a first longitudinal end of the base assembly effective for being engaged by a user's foot so as to stabilize the stand during pivoting of the support assembly between the clearance and support positions, and (vii) configuring and arranging the mounting assembly and support assembly to provide at least two longitudinally spaced engagement elements with relatively thin longitudinal profiles capable of independent longitudinal repositioning for alignment of each engagement element with a structural element of a motorcycle frame so as to accommodate motorcycles with a recessed frame (e.g., the engine extends lower than the frame).

BRIEF DESCRIPTION OF THE DRAWINGS

Fig. 11 is an enlarged front view of the first leg shown in FIG. 2.

FIG. 12 is an enlarged side view of the first leg shown in FIG. 11.

FIG. 15 is a side view of one embodiment of a tool f or engaging the pivot shaft and pivoting the mounting assembly and support assembly between the clearance position and the support position.

DETAILED DESCRIPTION OF THE INVENTION INCLUDING A BEST MODE

Figure 1:
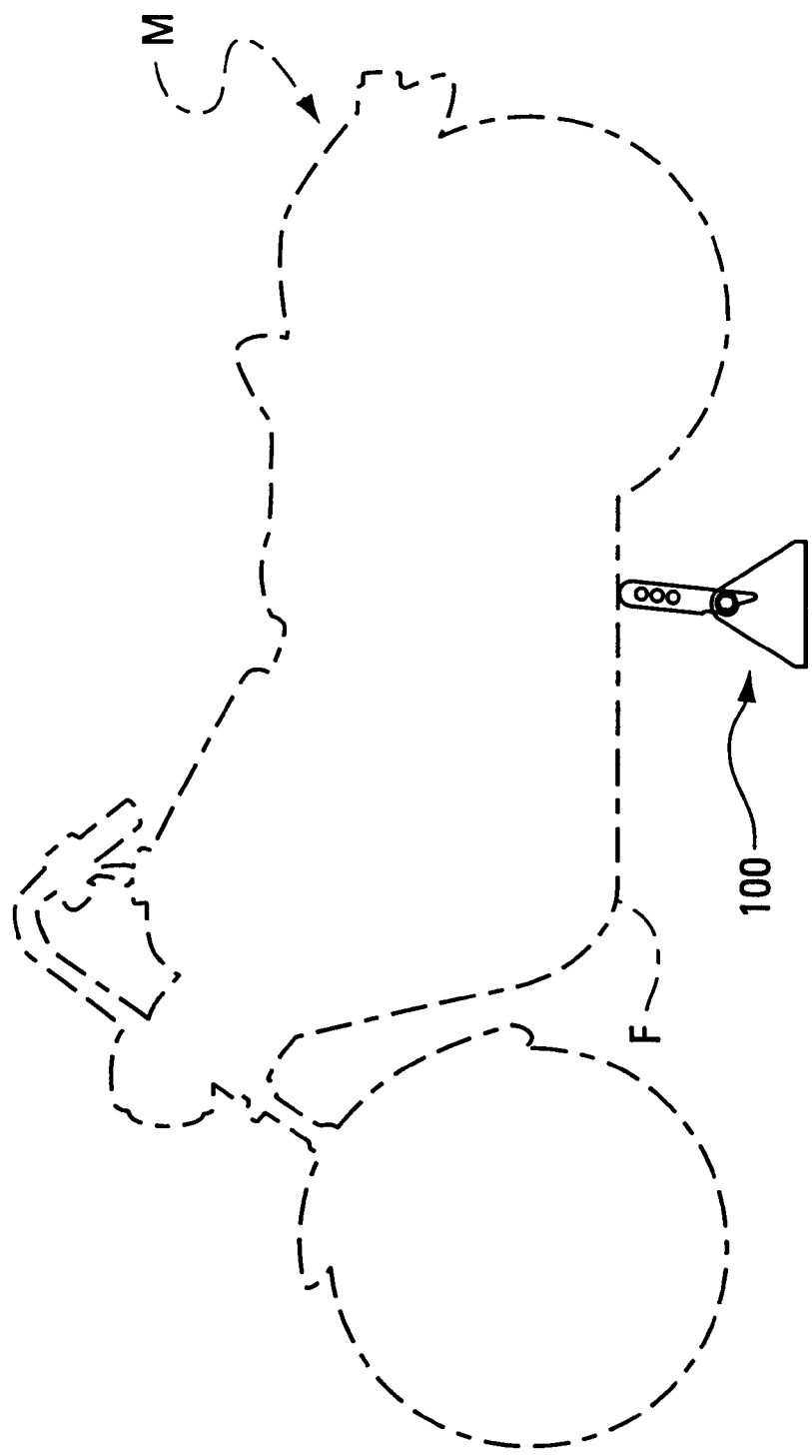
FIG. 1 is a side view showing a first embodiment of the stand positioned beneath and supporting a motorcycle.

Nomenclature
- F Frame of Motorcycle
- M Motorcycle
- 100 Stand
- 110 Base Assembly
- 111 Central Beam
- 111c Top Flange of Beam
- 111d Bottom Flange of Beam
- 112 First Leg
- 113 Foot Flange
- 114 Second Leg
- 115 Main Bearings
- 120 Support Assembly
- 121 Axle of Support Assembly
- 121a First End of Axle
- 121b Second End of Axle
- 121g Circumferential Grooves in Axle
- 122 Support Tube
- 123 Outer Layer of Material
- 125 Bearings for Axle of Support Assembly
- 130 Mounting Assembly
- 131 Pivot Shaft
- 131a First End of Pivot Shaft
- 131b Second End of Pivot Shaft
- 131g Circumferential Grooves in Pivot Shaft
- 132 Brackets
- 132a Proximal End of Bracket
- 132b Distal End of Bracket
- 133 Finger
- 134 Holes Through Bracket for Axle of Support assembly
- 135 Hole Through Bracket for Pivot Shaft
- 136 Outer Layer of Material
- 200 Tool
- 201 Handle
- 202 Socket
- 203 Dowel
- 220 Engagement Element
- 221 Connecting Pin
- 222 Y-Shaped Element
- 223 Legs of Y-Shaped Element
- 224 Arms of Y-Shaped Element
- 225 Lower Channel Defined by Legs of Y-Shaped Element
- 226 Upper Channel Defined by Arms of Y-Shaped Element
- 240 Shaft Collar Construction With reference to the drawings, and in particular to FIGS. 2, 3, 16 and 17, the motorcycle stand is generally indicated by reference number 100. A first embodiment of the motorcycle stand 100, depicted in FIGS. 1–15, includes a support assembly 120 rotatably mounted to a mounting assembly 130, which in turn is pivotably mounted to a base assembly 110. A second embodiment of the motorcycle stand 100, depicted in FIGS. 16–18, includes independent engagement elements 220 pivotably mounted to a mounting assembly 130, which in turn is pivotably mounted to a base assembly 110. As seen in FIG. 1, the first embodiment of the stand 100 is effective for supporting the frame F of a motorcycle M upon the support assembly 120 in an elevated position. Similarly, as seen best in FIG. 16, the second embodiment of the stand 100 is effective for engaging longitudinally spaced points of a motorcycle frame F within the engagement elements 220 and thereby supporting the motorcycle M in an elevated position.

BASE ASSEMBLY

Figure 2:
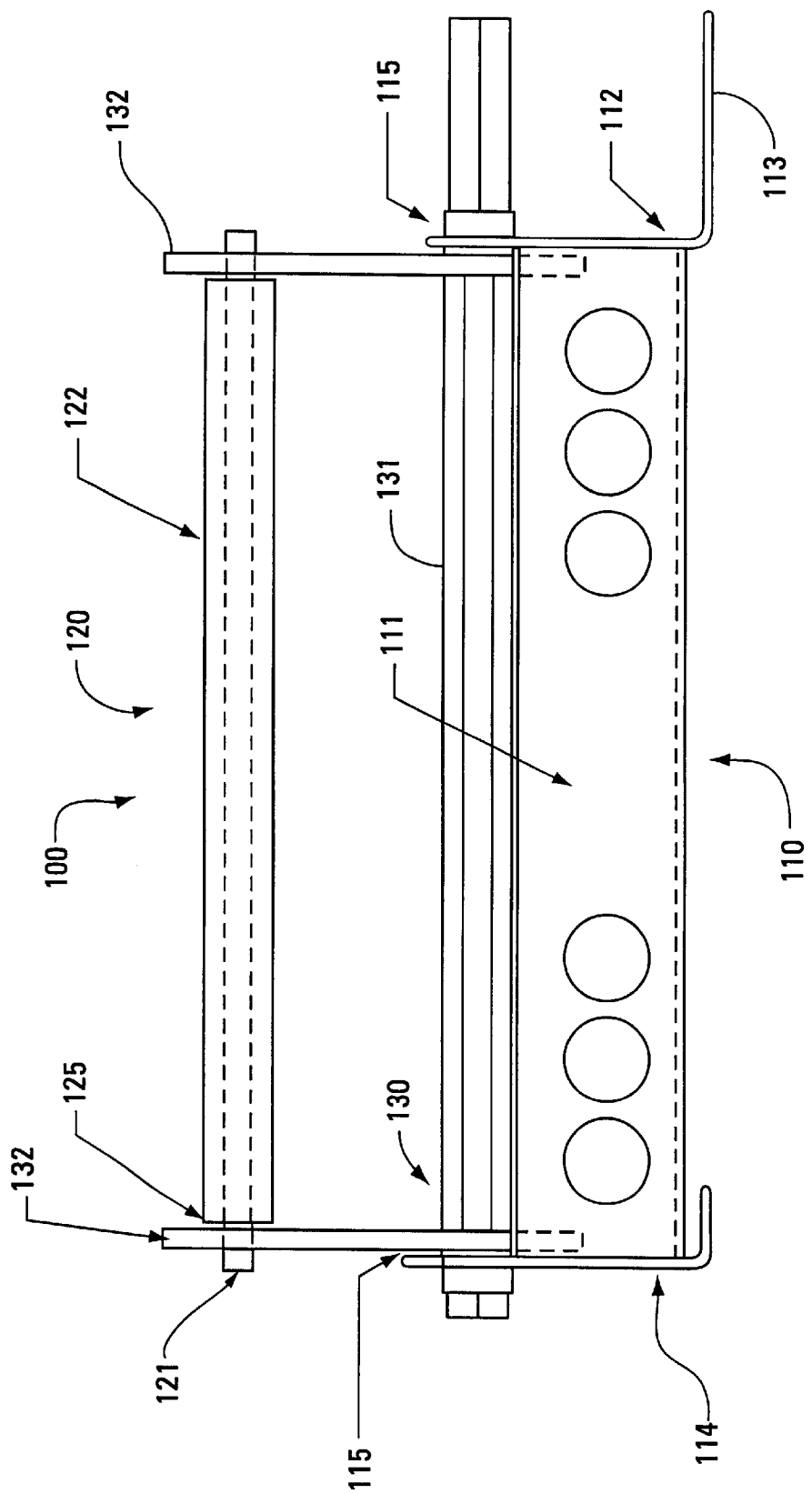
FIG. 2 is a front view of the first embodiment of the stand shown in FIG. 1 in the support position.
Figure 3:
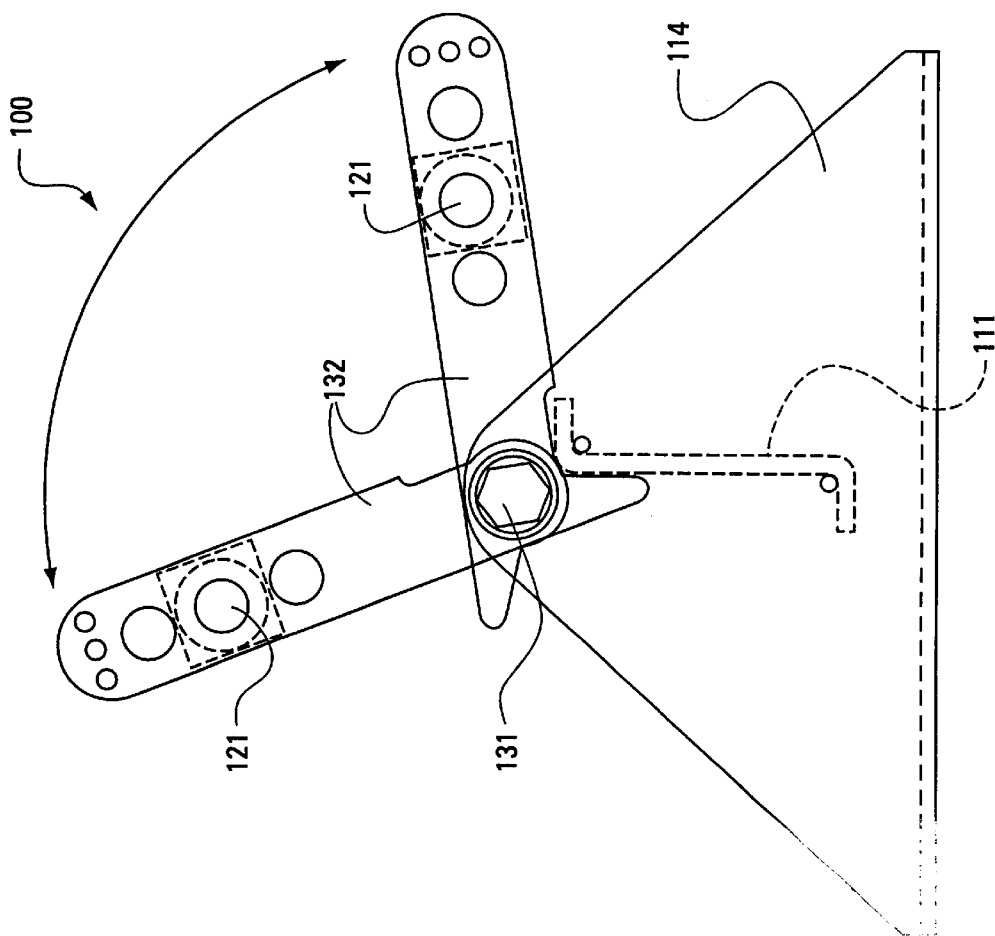
FIG. 3 is a side view of the stand shown in FIG. 2, showing pivoting of the mounting assembly and support assembly between the clearance position and the support position.

FIGS. 2 and 3 show an embodiment of the base assembly 110 comprising first 112 and second 114 triangular legs connected by a central beam 111.

Main bearings 115 are positioned within orifices (unnumbered) proximate the apex (unnumbered) of the triangular legs 112 and 114 for rotatably supporting pivot shaft 131 of the mounting assembly 130.

A foot flange 113 longitudinally extends from the bottom edge (unnumbered) of the first leg 112 a distance sufficient to permit the foot flange 113 to be engaged by a user's foot (not shown) for stabilizing the stand 100 during pivoting of the support assembly 120 between the clearance and support positions. Generally, a foot flange 113 having a longitudinal length of about 2 to 10 cm is effective for achieving the desired stabilization effect, with a length of about 6 to 10 cm generally preferred.

Figure 10:
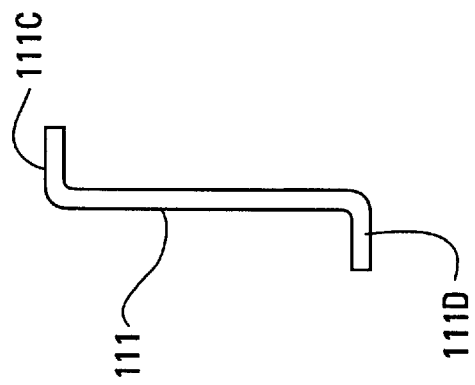
FIG. 10 is an enlarged side view of the central beam shown in FIG. 9.
Figure 14:
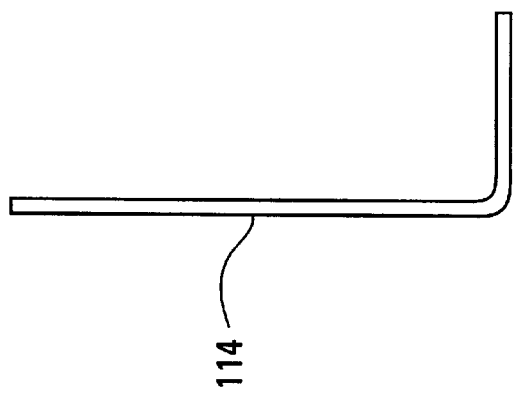
FIG. 14 is an enlarged side view of the second leg shown in FIG. 13.
Figure 13:
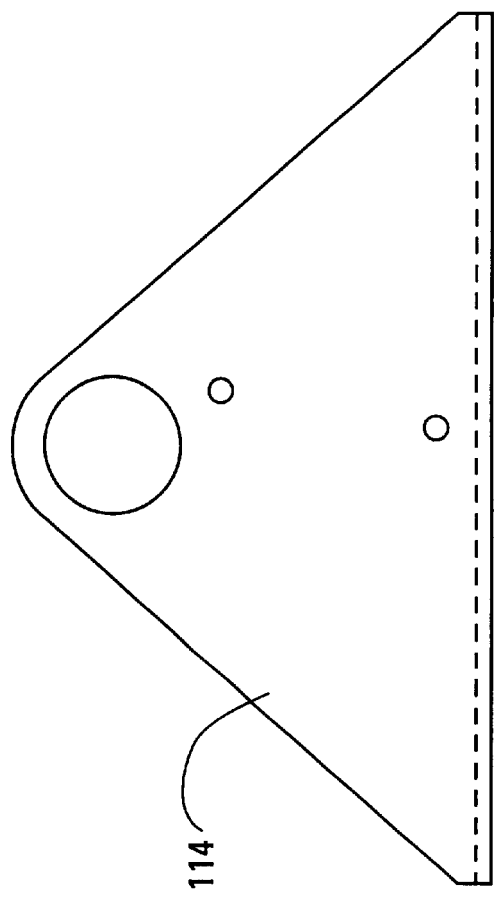
FIG. 13 is an enlarged front view of the second leg shown in FIGS. 2 and 3.

As shown best in FIGS. 3 and 10, the central beam 111 is preferably a Z beam having a forward extending top flange 111c and a rearward extending bottom flange 111d for purposes of providing superior lateral support (i.e., structural support from front to back), and providing a surface 111c for stopping continued motion of the brackets 132 at the clearance position as well as supporting the brackets 132 in the clearance position.

The beam 111 and legs 112 and 114 may be constructed from a single unitary piece of material or the beam 111 may be connected to the legs 112 and 114 by any convenient means such as welding.

MOUNTING ASSEMBLY

FIGS. 2 and 3 show an embodiment of the mounting assembly 130 comprising (i) a pivot shaft 131 rotatably supported within the main bearings 115 in the legs 112 and 114 of the base assembly 110, and (ii) a pair of brackets 132 proximate each longitudinal end 131a and 131b of the pivot shaft 131. The brackets 132 are fixedly attached to the pivot shaft 131 so that rotational motion of the pivot shaft 131 is translated into a pivoting motion of the brackets 132.

Pivot Shaft

Figure 5:
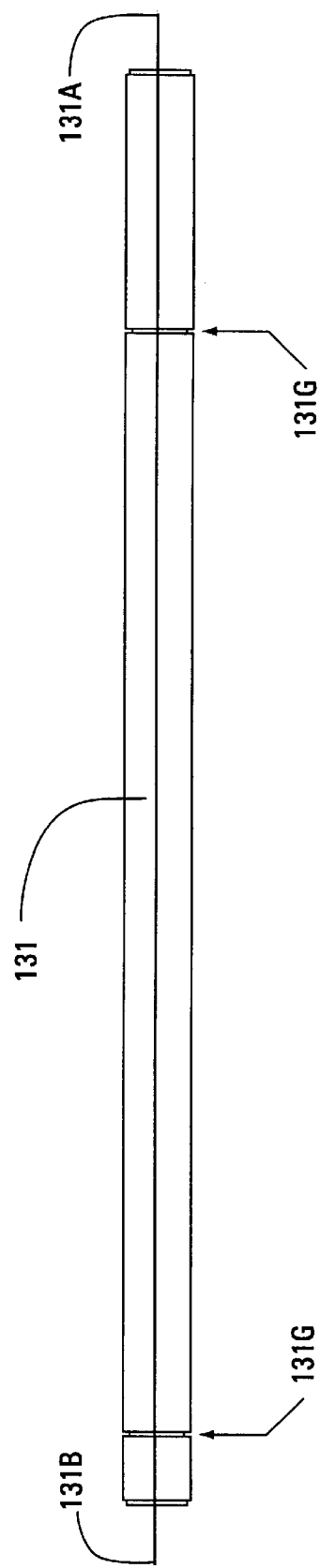
FIG. 5 is an enlarged front view of the pivot shaft shown in FIGS. 2 and 3.

As shown in FIG. 5, the pivot shaft 131 can be provided with circumferential grooves 131g proximate both longitudinal ends 131a and 131b for accommodating a retaining ring (not shown) and thereby preventing the pivoting shaft 131 from longitudinally sliding within the main bearings 115. Other similar retention means can be also be employed, such as a cotter pin (not shown) inserted through a radially extending hole (not shown) in each end 131a and 131b of the axle 131.

The first end 131a of the pivot shaft 131 extends a substantial distance beyond the vertical portion (unnumbered) of the first leg 112 to facilitate attachment of a socket 202 to the pivot shaft 131 for rotating the pivot shaft 131 between the clearance and support positions. The first end 131 of the pivot shaft 131, and optionally the entire length of the shaft 131, preferably has a cross-section with corners (e.g., triangular, square, pentagonal, hexagonal, etc.) which can be engaged by a matching socket 202. If desired, the pivot shaft 131 can be configured and arranged so that both ends 131a and 131b of the pivot shaft 131 project a sufficient distance beyond the corresponding leg 112 and 114 that the pivot shaft 131 can be accessed and rotated from either end of the stand 100.

Brackets

Figure 4:
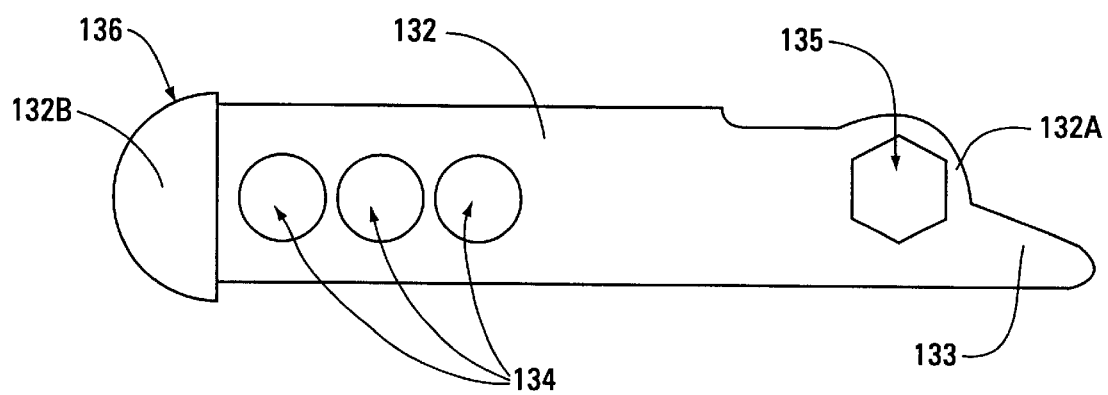
FIG. 4 is an enlarged side view of one of the brackets shown in FIGS. 2 and 3.

As shown best FIG. 4, each of the brackets 132 includes (i) a hole 135 proximate the proximal end 132a of the bracket 132 for permitting passage of the pivot shaft 131 through the bracket 132, (ii) a plurality of transversely spaced holes 134 proximate the distal end 132b of the bracket 132 for accommodating a support assembly bearing 125 and permitting passage of the support assembly axle 121 through the bearing 125, and (iii) an offset finger 133 extending from the proximal end 132a of the bracket 132 for contacting the central beam 111 so as to stop continued motion of the brackets 132 at the support position and serve to support the brackets 132 and support assembly 120 in the support position, including any motorcycle M resting upon the support assembly 120.

When the pivot shaft 131 has a cross-sectional configuration with corners (e.g., triangle, square, pentagon, hexagon, etc.), and hole 135 is preferably shaped to match the cross-sectional shape of the pivot shaft 131 so that rotation of the pivot shaft 131 results in a pivoting of the brackets 132 about the longitudinal axis (not shown) of the pivot shaft 131.

As shown best in FIG. 3, the brackets 132 are pivoted slightly past the center of gravity when in the support position. This tends to lock the brackets 132 and support assembly 120 into position and prevent accidental pivoting of the brackets 132 and support assembly 120 from the support position to the clearance position, particularly when the additional weight of a motorcycle M is bearing down upon the support assembly 120. Generally, an angle of about 2° to 10° past the center of gravity is effective for locking the brackets 132 and support assembly 120 into the support position.

As may be seen best in FIGS. 1, 2 and 3, the distal ends 132b of the brackets 132 extend beyond the support assembly 120 and serve as stops to ensure that the frame F of a motorcycle M remains centered on the support tube 122. The distal ends 132b of the brackets 132 can be coated with an outer layer 136 of a soft material, such as a natural or synthetic rubber or polyurethane compound, to prevent the distal ends 132b of the brackets 132 from scratching the frame F of a motorcycle M mounted upon the stand 100.

SUPPORT ASSEMBLY

In a first embodiment of the stand 100, a support assembly 120 is rotatably retained in a transversely spaced relationship relative to the base assembly 110 by the brackets 132.

Figure 6:
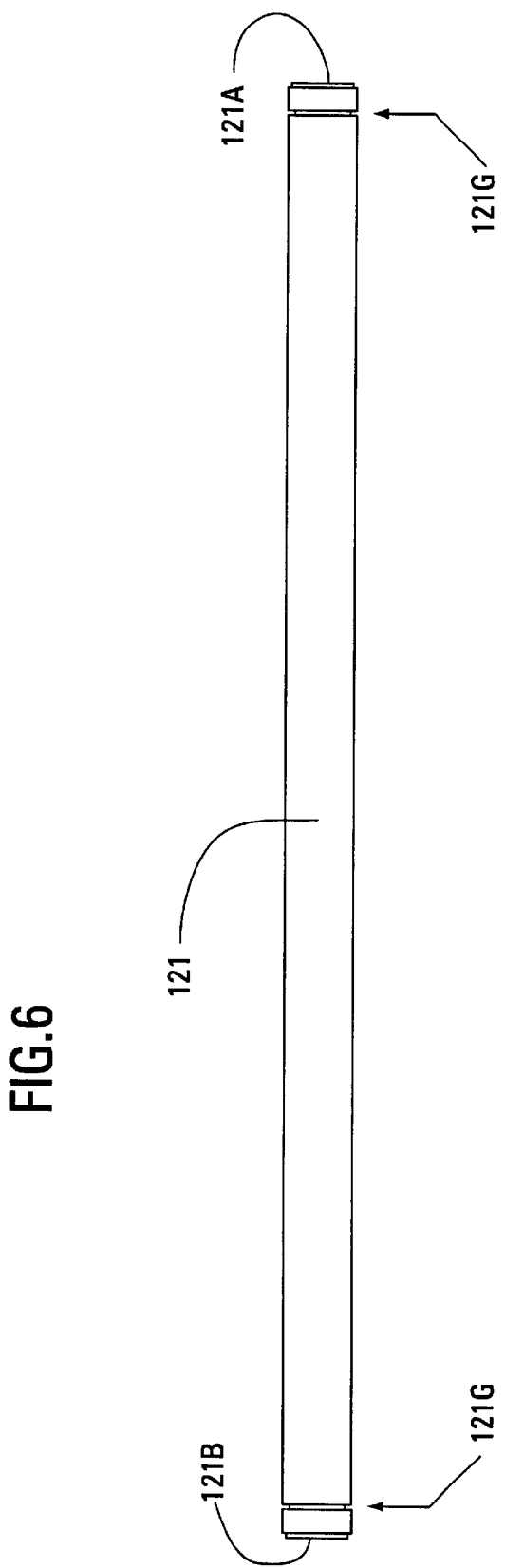
FIG. 6 is an enlarged front view of the support assembly axle shown in FIGS. 2 and 3.
Figure 7:
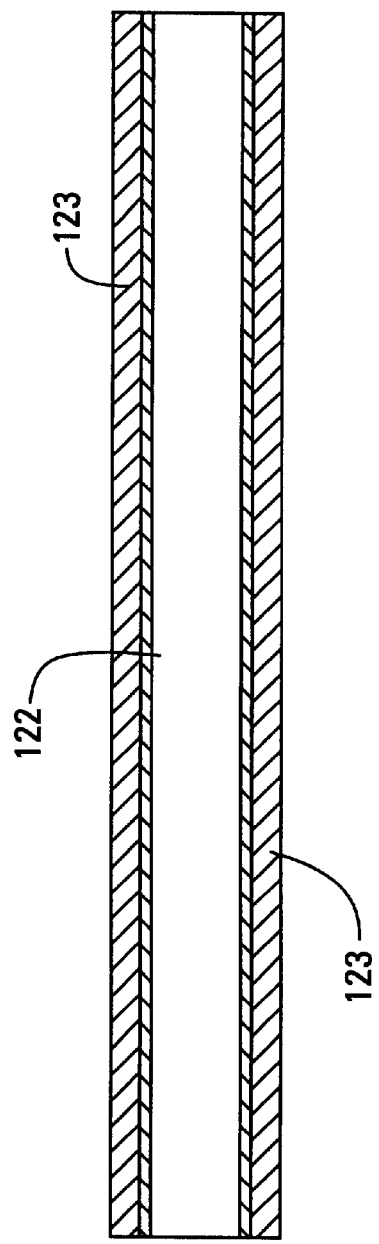
FIG. 7 is an enlarged front view of the support tube shown in FIGS. 2 and 3.
Figure 8:
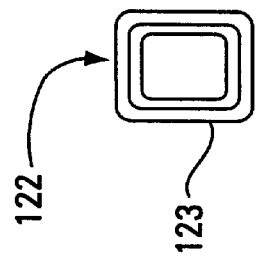
FIG. 8 is an enlarged side view of the support tube shown in FIG. 7.
Figure 9:
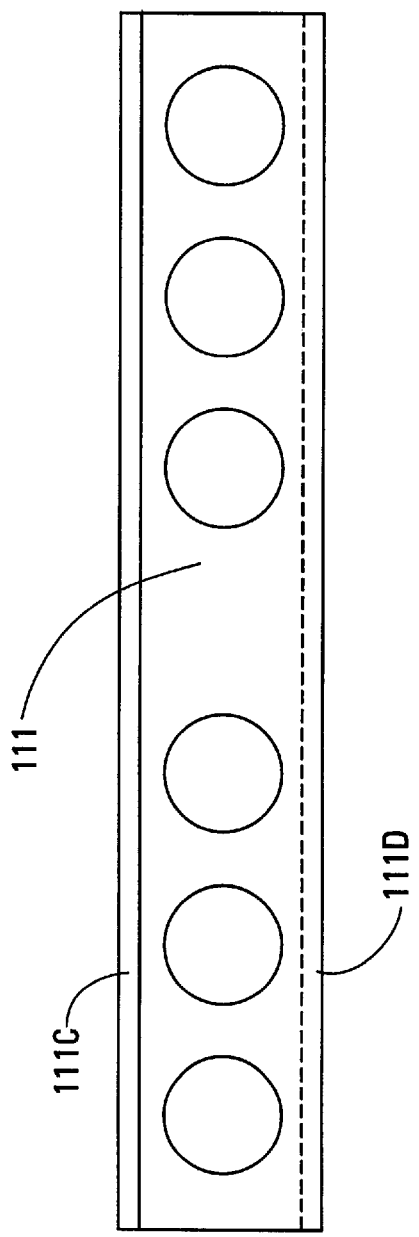
FIG. 9 is an enlarged front view of the central beam shown in FIGS. 2 and 3.

FIGS. 6 and 7 show an embodiment of the support assembly 120 comprising an axle 121 and a support tube 122. The channel (unnumbered) through the support tube 122 is sized to accommodate passage of the axle 121 with limited tolerance.

The support tube 122 can be coated with an outer layer 123 of a soft material, such as a natural or synthetic rubber or polyurethane compound, to prevent the support tube 122 from scratching the frame F of the motorcycle M.

Support assembly bearings 125 are provided at both ends 121a and 121b of the axle 121 for rotatably supporting the axle 121 within an aligned pair of holes 134 through the brackets 132.

As shown in FIG. 6, the axle 121 can be provided with circumferential grooves 121g proximate both longitudinal ends 121a and 121b for accommodating a retaining ring (not shown) and thereby preventing the axle 121 from longitudinally sliding within the bearings 125. Other similar retention means can be also be employed, such as a cotter pin (not shown) inserted through a radially extending hole (not shown) in each end 121a and 121b of the axle 121.

ENGAGEMENT ELEMENTS

In a second embodiment of the stand 100, an engagement element 220 is pivotably attached to the distal end 132d of each of the brackets 132.

Figure 16:
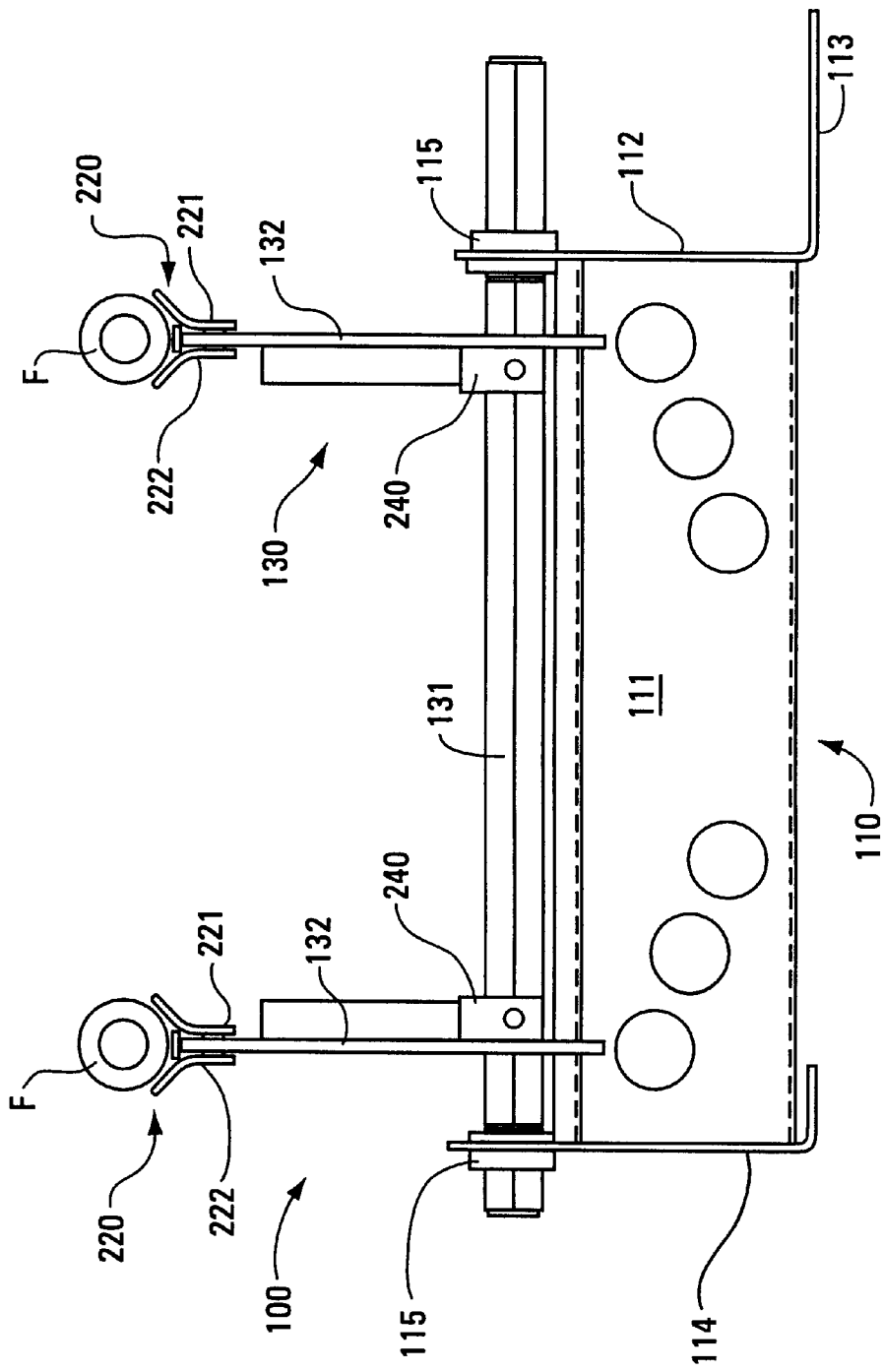
FIG. 16 is a front view of a second embodiment of the stand shown in the support position.
Figure 18:
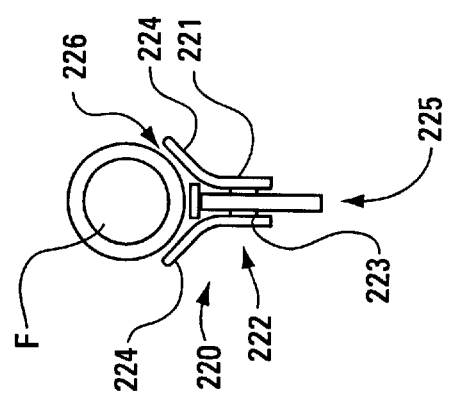
FIG. 18 is an enlarged front view of one of the engagement elements attached to the distal end of one of the brackets as shown in FIG. 16.
Figure 17:
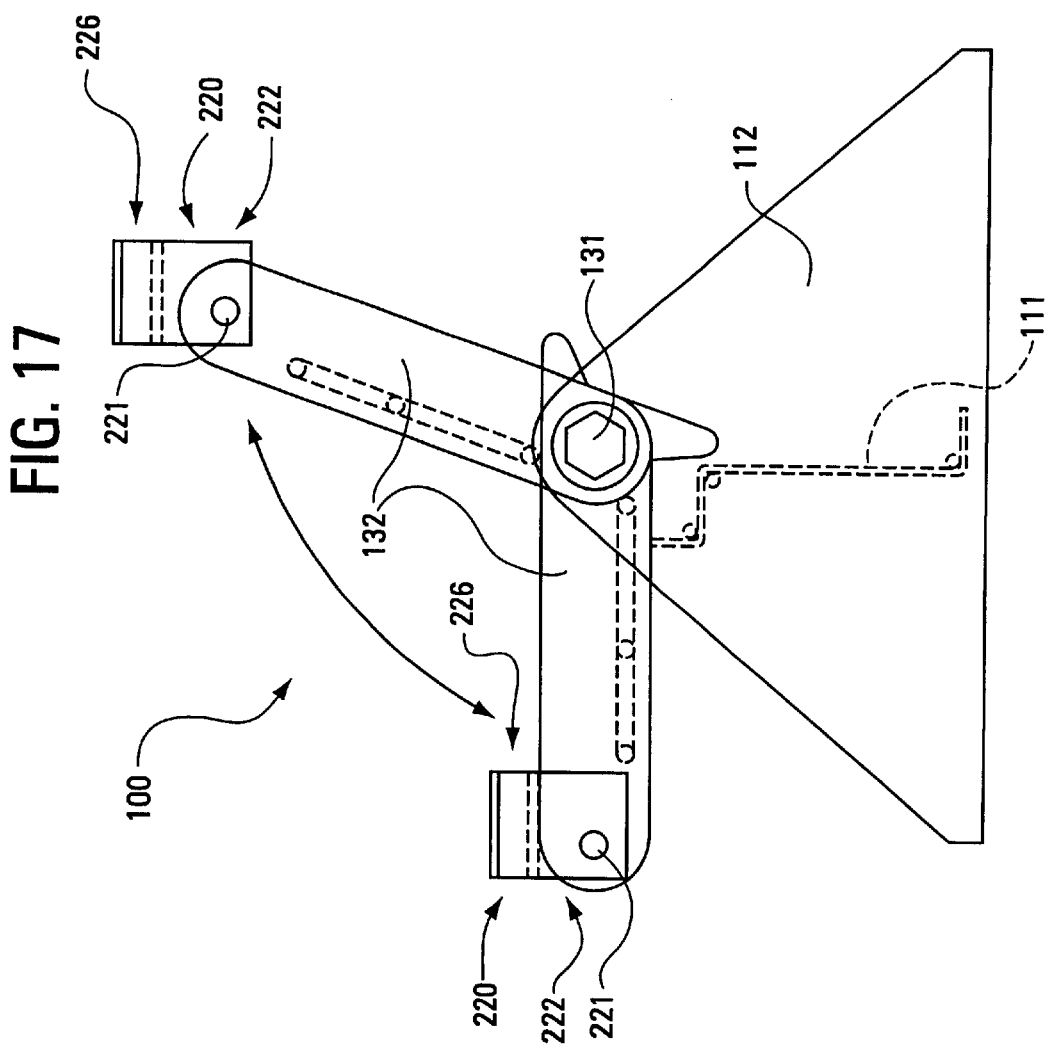
FIG. 17 is a side view of the stand shown in FIG. 16, showing pivoting of the mounting assembly and support assembly between the clearance position and the support position.

FIGS. 16–18 show an embodiment of an engagement element 220 comprising a generally Y-shaped element 222 having a pair of legs 223 defining an open-faced lower channel 225, and a pair of arms 224 defining an open-faced upper channel 226. The open-faced lower channel 225 is sized to accommodate positioning of the distal end 132d of a bracket 132 within the lower channel 225. The open-faced upper channel 226 is sized to engage and retain a segment of a motorcycle frame F.

The Y-shaped elements 222 are pivotably connected to the distal end 132d of a bracket 132 by a connecting pin 221 extending through longitudinally aligned orifices (unnumbered) in the legs 223 of the Y-shaped element 222 and the distal end 132d of the corresponding bracket 132.

The Y-shaped elements 222 can be coated with an outer layer (not shown) of a soft material, such as a natural or synthetic rubber or polyurethane compound, to prevent the engagement elements 220 from scratching the frame F of the motorcycle M.

As shown in FIG. 16, the brackets 132 can be provided with a shaft collar 240, circumscribing hole 135 in the bracket 132 for permitting independent longitudinal repositioning of each of the brackets 132 and the engagement means 220 along the pivot shaft 131. The ability to independently longitudinally reposition the engagement means 220 permits the engagement means 220 to be repositioned as necessary to accommodate different motorcycle models having differently sized and configured frames F.

TOOL

A tool 200 can be provided to facilitate rotation of the pivot shaft 131 and effect pivoting of the brackets 132 and support assembly 120 between the clearance and support positions.

FIG. 15 shows an embodiment of the tool 200 comprising a handle 201 with a suitably sized and shaped socket 202 removably attached to one end of the handle 201 by a dowel 203. The other end of the handle 201 can be knurled (not shown) or coated with a soft material, such as a natural or synthetic rubber or polyurethane, to enhance gripability of the tool 200.

Use

As shown best in FIGS. 1, 2 and 3, the first embodiment of the stand 100 is used by (i) placing the support assembly 120 into the clearance position, (ii) sliding the stand 100 underneath the frame F of the motorcycle M at the desired location, (iii) attaching the socket 202 to the handle 201, (iv) engaging the first end 131a of the pivot shaft 131 with the socket 202, (v) stepping onto the foot flange 113 to stabilize the stand 100, and (vi) rotating the pivot shaft 131 so as to effect pivoting of the support assembly 120 from the clearance position, generally horizontal to the ground, to the support position, generally vertical to the ground and slightly past the center of gravity. Once the support assembly 120 begins to pivot beyond the center of gravity, the weight of the motorcycle M upon the support assembly 120 will cause the support assembly 120 to drop and lock in the support position, with the fingers 133 of the brackets 132 bearing upon the central beam 111 of the base assembly 110. The socket 202 can then be detached from the pivot shaft 131 and stored until the stand 100 needs to be removed.

Use of the second embodiment of the stand 100 is identical to use of the first embodiment except that the first time the second embodiment is used with a given motorcycle M, each of the brackets 132 and the corresponding engagement element 220 must be longitudinally aligned with an appropriate section of the motorcycle frame F before the pivot shaft 131 is rotated into the support position.

Both the first and second embodiments of the stand 100 can be quickly and easily removed from underneath the motorcycle M by simply (i) attaching the socket 202 to the handle 201, (ii) engaging the first end 131a of the pivot shaft 131 with the socket 202, (v) stepping onto the foot flange 113 to stabilize the stand 100, and (iii) rotating the pivot shaft 131 so as to effect pivoting of the support assembly 120 from the support position to the clearance position. Once the support assembly 120 begins to pivot beyond the center of gravity, the weight of the motorcycle M upon the support assembly 120 will force the support assembly 120 to move towards the clearance position until the elevated end of the motorcycle M contacts the ground. Gravity will cause the support assembly 120 and the brackets 132 to continue pivoting toward the clearance position until the front edge (unnumbered) of the brackets 132 bear against the top (unnumbered) of the central beam 111 of the base assembly 110. Once the support assembly 120 is in the clearance position, the socket 202 can be detached from the pivot shaft 131 and the stand 100 slid from underneath the motorcycle M. The stand 100 and tool 200 can then be stored together until needed.

When in the support position, the support assembly 120 engages the frame F of the motorcycle M and lifts or elevates an end of the motorcycle M off the ground.

The height to which the first embodiment of the stand 100 lifts the motorcycle M can be quickly adjusted by simply (i) removing the retaining ring (not shown) from the circumferential groove 121g in the first end 121a of the axle 121, (ii) sliding the axle 121 through the hole 134 in the bracket 132 proximate the first end 121a of the axle 121, with continued sliding of the axle 121 through the support tube 122 and the hole 134 in the distal bracket 132, (iii) reinserting the axle 121 through a different hole 134 in the distal bracket 132 followed by reinsertion of the axle 121 through the support tube 122 and the aligned hole 134 in the proximal bracket 132, and (iv) replacing the retaining ring. The procedure can also be done from the other end of the stand 100 by removing the retaining ring (not shown) from the circumferential groove 121g in the Second end 121b of the axle 121.

While preferred embodiments of the invention have been described, it should be understood that various changes, adaptations and modifications my be made to the invention without departing from the spirit of the invention and the scope of the appended claims.

I claim:

1. A hand-operable stand, comprising:
   (a) a base having a first longitudinal end and a second longitudinal end,
   (b) a support assembly pivotably attached to the base for pivoting between a clearance position and a support position,
   (c) a flange longitudinally extending from the first longitudinal end of the base, wherein the flange is configured and arranged to be engaged by a user's foot for stabilizing the stand during pivoting of the support assembly between the clearance and support positions, and
   (d) a means for preventing continued pivoting of the support assembly beyond the support position.

2. The stand of claim 1 further comprising a mounting assembly pivotably attached to the base and holding the support assembly in a transversely spaced relationship relative to the base, wherein the support assembly and mounting assembly are pivotable together between the clearance position and the support position.

3. The stand of claim 2 wherein the mounting assembly includes (i) a pivot shaft rotatably attached to the base, and (ii) a pair of longitudinally spaced brackets fixedly attached to the pivot shaft at a first end so as to translate rotation of the pivot shaft to pivoting of the brackets, and attached to the support assembly at a second end.

4. The stand of claim 3 whereinn the pivot shaft has a hexagonal cross-section.

5. The stand of claim 1 wherein the support assembly comprises a roller rotatable about a longitudinal axis.

6. The stand of claim 3 wherein the support assembly comprises (i) a first engagement means defining an open-faced transversly-extending channel pivotably attached proximate the distal end of one of the brackets, and (ii) a second engagement means defining an open-faced transversly-extending channel pivotably attached proximate the distal end of the other bracket.

7. A hand-operable stand, comprising:
   (a) a base;
   (b) a mounting assembly pivotably attached to the base for pivoting between a clearance position and a support position, wherein the mounting assembly includes a pair of longitudinally spaced brackets with both brackets bearing against the base when in the support position, wherein the mounting assembly further includes a pivot shaft assembly attached to the base and fixedly attached to the brackets so as to translate rotation of the pivot shaft to pivoting of the brackets,
   (c) a support assembly secured to the mounting assembly for pivoting in combination with the mounting assembly between the clearance position and the support position,
   (d) wherein the stand is effective for being positioned underneath the frame of a motorcycle when in the clearance position and supporting at least one end of the motorcycle upon the support assembly in an elevated position when in the support position.

8. The stand of claim 7 wherein:
   (a) the base includes (i) a longitudinally extending beam, (ii) a first leg secured to the beam proximate a first longitudinal end of the beam, and (iii) a second leg secured to the beam proximate a second longitudinal end of the beam, and
   (b) the mounting assembly bears against the beam when in the support position.

9. The stand of claim 8 wherein the first and second legs are triangular support members.

10. The stand of claim 7 wherein the pivot shaft has a hexagonal cross-section.

11. The stand of claim 10 wherein the support assembly comprises a roller rotatable about a longitudinal axis.

12. The stand of claim 11 wherein the support assembly comprises (i) a first engagement means defining an open-faced transversly-extending channel pivotably attached proximate the distal end of one of the brackets, and (ii) a second engagement means defining an open-faced transversly-extending channel pivotably attached proximate the distal end of the other bracket.

13. The stand of claim 7 wherein the support assembly pivots beyond the center of gravity when pivoted from the clearance position to the support position.

14. The stand of claim 13 wherein the support assembly pivots about 2° to 10° beyond the center of gravity when pivoted from the clearance position to the support position.

15. The stand of claim 7 further comprising means for adjusting the position of the support assembly relative to the base so as to increase or decrease the distance between the support assembly and the base.

16. A hand-operable stand, comprising:

(a) a base having a first longitudinal end and a second longitudinal end, (b) a mounting assembly pivotably attached to the base for pivoting between a clearance position and a support position, wherein the mounting assembly bears against the base when in the support position for preventing continued pivoting of the support assembly beyond the support position, (c) a support assembly secured to the mounting assembly for pivoting in combination with the mounting assembly between the clearance position and the support position, (d) a means for repositionably attaching the support assembly to the mounting assembly at a plurality of different positions relative to the base, with each position providing a different distance between the support assembly and the base, and (e) a flange longitudinally extending from the first longitudinal end of the base, wherein the flange is configured and arranged to be engaged by a user's foot for stabilizing the stand during pivoting of the support assembly between the clearance and support positions.

* * * * *